June 11, 1957   P. A. FRANK   2,795,262
METHOD OF PRODUCING A PNEUMATIC TIRE
Filed July 16, 1952
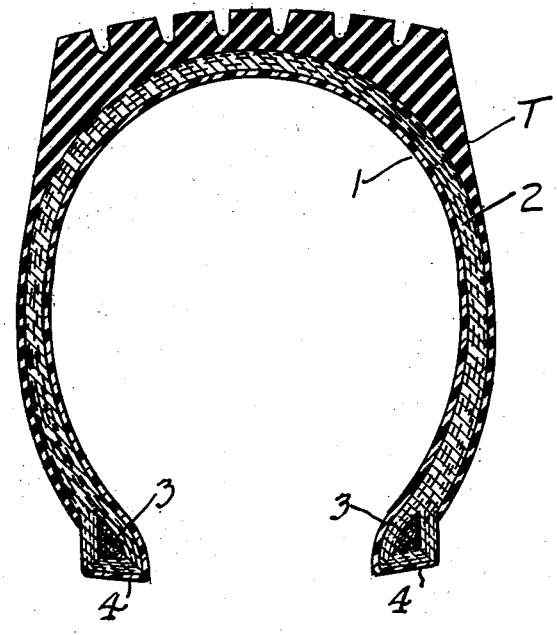
INVENTOR.
PAUL A. FRANK
BY
Oberlin & Limbach
ATTORNEYS.

United States Patent Office 2,795,262
Patented June 11, 1957

2,795,262

METHOD OF PRODUCING A PNEUMATIC TIRE

Paul A. Frank, Akron, Ohio

Application July 16, 1952, Serial No. 299,230

4 Claims. (Cl. 154—14)

My invention relates to a pneumatic tire carcass and an improved method for producing pneumatic tire carcasses. For many years it has now been universal practice to build pneumatic tires in flat band form on a collapsible drum. Plies of rubberized cord fabric are wound around the drum. A steel wire bead is tied in at opposite sides of the band by turning the plies of fabric up or down around the bead. A slab of rubber compound which forms the wearing tread of the tire is then placed around the fabric band. Thereafter the completed green tire is removed from the drum by collapsing the latter and is ready for shaping and vulcanizing.

The further processing of the thus formed green band is usually accomplished in either of two ways.

One method is to expand the flat band into normal tire shape in any of several types of machines available for this purpose. After the expanding operation, a relatively heavy walled curing tube is inserted and the tire then cured by being enclosed in a heated mold while expanded by the admission of a curing medium such as steam or hot water to the inside of the curing tube. Another and preferred method is to place the green flat band tire in an automatic vulcanizer such as is disclosed in my issued patent, No. 2,559,119, in which a relatively thin flexible rubber diaphragm is used for the dual purpose of expanding the tire during the initial forming operation and to then contain the curing medium such as steam or hot water during the curing cycle and during which time the tire, now enclosed in separable mold sections, is forced outwardly into intimate contact with the mold under the influence of pressure within the diaphragm.

This latter type of operation is gaining considerable favor in the industry not only because it eliminates much manual labor incidental to the old type expanding operation, but is also preferred because the relatively thin diaphragm, which is used to assist in forming the tire and to contain the curing medium, is a much less effective heat barrier than the old thicker "air bag" or curing tube so that not only is the curing time of the tire reduced but a more uniform cure is effected resulting in a superior tire.

It is a principal object of the present invention to provide still a further improvement on the process as carried out for example in my aforesaid issued Patent No. 2,559,119 whereby improved products are produced, greater economies achieved and other desirable ends realized.

It is a further object of my invention to provide an improved process by which is produced a cured pneumatic tire casing which is novel per se and which has properties making it superior to any tires produced heretofore.

Other objects and advantages will become apparent as the following description proceeds.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

In the accompanying drawing, the single figure is a radial cross-section view of a pneumatic tire carcass made in accordance with my invention.

Broadly stated, this invention comprises the process of forming a cured pneumatic tire casing T by applying to the inner surface of the green tire a film 1 of a silicone compound which makes unnecessary the use of an inflatable diaphragm when the tire is cured for example in a press such as is illustrated in my above-identified patent.

The green tire carcass will ordinarily be constructed from cord fabric 2 like that now commonly employed in tire manufacture. This fabric 2 is generally formed of a series of closely adjacent parallel cords of natural or synthetic fibers, which cords are impregnated with and cemented together by means of natural or synthetic rubber so that in the cured condition the rubber of the various plies is fused together into a homogeneous structure in which are embedded in properly separated relationship the natural or synthetic fibrous cords which give to the tire its structural strength.

Because the fabric 2 from which the green tire is thus constructed is itself not impervious to air, steam or hot water under pressure and since there are seams between the ends of each ply and between adjacent plies, some means must be provided to prevent the fluid under pressure, which is utilized to shape the tire and to expand and heat the same during the curing operation, from seeping into the body of the tire carcas. Any such seepage would result in the formation of bubbles and blisters or like imperfections which would so materially weaken the tire in the area in which they occur as to make the tire practically useless. It is for this reason that, as above explained, the fluid under pressure utilized to expand the tire during the forming operation and to further expand and heat the tire internally during the curing operation has always been contained in a suitable tube or bag. When an effort has been made to cure tires without such a confining bag and to substitute therefore a permanent interliner in the carcass made for example of a rubber compound, these efforts have been impractical due to the excessive thickness of the liner material necessary to prevent leakage of the curing medium making the cost per cure higher than when employing an air bag or diaphragm.

I have now found, however, that the confining bag for the forming and curing fluid may be omitted if the green tire carcass is provided on the inner surface thereof with which the forming and curing fluid is in contact, with a relatively thin film 1 of a silicone polymer.

The silicone materials which may be used for this purpose occur in a relatively wide variety of forms although for best results I propose to employ those silicone polymers which are now generally referred to in the trade as silicone rubber, these silicone polymer elastomers, as well known, being of the type-structure having silicon atoms and silicon-oxygen linkages, and with side group organic radicals connected by carbon-silicon linkages to silicon. There are numerous commercial forms of silicone rubber which are available for use. Dow-Corning Corporation makes available to the trade a number of silicone materials under the trade name "Silastic." The silastic material is itself available in several different types, among which are those identified by the following code numbers, viz: 250; 6–150; 6–160; 6–161; 6–167; 6–180; 6–181; 7–170; 7–16.3; 7–180 and 7–181. Also useful for this purpose are X–1740 and X–6049.

The silicone rubber compositions thus available in the trade today are capable of being formed by either molding, extruding, calendering, sheeting or solution coating. Their processing program is generally similar to that required for organic rubber excepting that the curing process usually requires higher temperatures and longer periods of time than are necessary to vulcanize organic rubber. These silicone rubbers are generally prepared by first preparing an elastomeric gum by treating the hydrolysis product of very pure dimethyl, dichlorxylene with one or more reagents which are effective in increasing the molecular weight without resorting to cross linkage. The process for the production of such elastomeric gum is given in detail by Rochow, "Chemistry of the Silicones," John Wiley & Sons, Inc., New York (1946), pages 72 and 73; also Patent No. 2,460,795.

The gum thus prepared can be milled with fillers and vulcanizing agents and as indicated above can be fabricated like organic rubber and when vulcanized or cross linked acquire the elasticity necessary for use in my invention.

In the light of the foregoing, the silicone film 1 may be applied to the inner surface of the green tire carcass in any of a variety of ways depending upon the properties of the starting materials selected for use.

As indicated above these silicone rubbers are available in solution coatings and thus they may be applied in the form of a solution coating to the inner periphery of the green tire carcass in a variety of ways. The solution may be painted or sprayed. A film 1 of silicone may be applied to the drum on which the tire is built before the application thereto of the first cord ply which will ultimately form the inner ply of the tire so that as the tire is built on the drum the film will become affixed by preferential adhesion to the tire and adhere thereto when the completed pulley band carcass is removed from the tire building drum. Alternatively, the silicone film may be applied to the inner periphery of the pulley band tire after it has been removed from the building drum. When employing a film coating, it is preferred to apply the same to the pulley band after it has been removed from the drum since in this manner it is easier to insure complete and uniform coverage to the desired uniform degree of thickness not only over the entire inner periphery of the pulley band, but also over the outer surfaces of the bead portions 3 of the uncured tire which usually extend at an angle to the plane of the drum.

As explained above, silicone materials which may be used in my invention require a longer time of curing than does the organic rubber of the body of the tire. Thus, when using a solution coating as the source of the silicone film 1 it may be necessary to at least partially pre-cure such film before the pulley band carcass is subjected to preliminary formation into generally the shape of the finished tire and before the introduction of the curing and expanding medium to the interior of the tire during the actual vulcanization operation.

Generally, precuring may best be accomplished, if as indicated above, the solution or film coating is applied to the inner and bead surfaces of the pulley band, subsequent to its being formed on the building drum. When this procedure is followed the thus inside coated tire T may be placed on a heating drum which is in contact with the silicone film to be cured or, preferably, the preliminary cure of the thus applied silicone film may be accomplished by means of radiant heat applied thereto. The use of radiant heat will be found preferable for use with certain solution coatings of these silicone materials since in this way the silicone film may be preliminarily cured without any substantial heating of the organic rubber portion of the tire which would require modification of the normal curing cycle to which such organic rubber is ultimately subjected in the mold.

The degree to which the solution-applied silicone film 1 is thus cured will depend upon the character of the particular solution employed. Inasmuch as the completely cured film is not deteriorated by the conditions of temperature, pressure and time encountered during the normal curing cycle for the organic rubber during the final vulcanization of the tire, it is permissible and desirable to effect a complete cure as for example by radiant heating of the solution-applied silicone film before the pulley band form of green tire carcass is subjected to the further steps of forming and vulcanization.

Instead of applying the silicone material to the green tire carcass in the form of a solution coating, this may be accomplished by pre-forming as by molding, extruding, calendering or sheeting operations the silicone material into a relatively thin film which is then in itself cured, partially cured or fully uncured state applied to the tire carcass in any of several ways.

The thus pre-formed sheet or film 1 of silicone material may be applied to the carcass by applying it as the first layer on the building drum and then buildinng the entire pulley band carcass thereon. When this is done enough of the film may be permitted to project beyond the ends of the pulley band tire so that as a final operation such projecting portions may be turned up around the beads 3 as represented by reference numerals 4 to provide a full and continuous film of the silicone material over all of those portions of the tire carcass with which the forming and vulcanizing fluid eventually comes in contact.

A preferred method of constructing tires in accordance with my invention is to apply the silicone film 1 to that face of the ply 2 of the tire carcass which faces the building drum prior to the application of such inner ply to the building drum. This can be accomplished conveniently by forming bias cuts of the inner ply similar to the procedure followed in preparing such bias cuts for use in conventional tire building procedure. These bias cuts are then sliced end to end to provide a continuous elongated trip of first-ply material with the cords thereof extending parallel to each other diagonally of the longitudinal axis of the strip. The thus-formed strip may then be passed through a suitable calendar or the like and a coating of desired thickness of the silicone elastomer applied to that side of the strip which will face the building drum when a tire is constructed. The layer 1 of silicone elastomer thus applied to the bias strip may be either pre-formed and in such case preferably at least slightly pre-cured or the film may be spread on the ply strip by the calendar rolls in its uncured state and if a pre-cure is desired, this can be accomplished preferably after the carcass is built in any of the modes previously explained.

As an alternative procedure, the silicone sheet may be applied to the inner periphery of the green tire carcass after the same has been removed from the building drum and while it is still in pulley band form. This alternative procedure makes possible, if desired, the application of a wide variety of adhesion promoter or adhesion deterrent materials between the silicone film and the body of the tire. An adhesion promoting material may be applied between the silicone film and the body of the tire as by preliminarily coating the interior of the tire prior to the application of the pre-formed film thereto, with an adhesion promoting material such as silicone rubber in the form of a solvent coating material. This step may be utilized particularly when it is desired to leave the pre-formed silicone film cemented to the inside of the finished tire during actual service use. Since the silicone rubber films such as are contemplated for use in my invention generally have a tensile strength of from 2 to 6 times the tensile strength of organic rubber, the provision of a film of such silicone rubber on the inner surface of the finished tire during its life-time materially strengthens the tire and prolongs its useful life. Furthermore, the silicone film being air impervious and having good resistance to high temperature deterioration and cracking, renders the tire having such film therein, suitable for use without the conventional tube.

When, however, for certain reasons, it is desired to remove the silicone film from the inner periphery of the tire, prior to placing it in actual service an adherence deterrent material may be applied to the major portion of the inner periphery of the pulley band carcass, or on the tire facing side of the silicone film prior to the application of the latter to the tire. There should be left coated with the adherence deterrent material, a narrow area on the beads of the tire so that the pre-formed silicone film will adhere to the tire in these areas. This will usually be found sufficient to hold the silicone film in place during the subsequent steps of forming and vulcanizing the tire carcass after which the silicone film may be stripped from the main body of the carcass to which the adherence deterrent material is applied. As an example of adherence deterrent materials which may be used for this purpose may be mentioned chalk, talc, soap and other inert materials including certain of the low molecular weight silicone polymers which are currently in use to a certain extent for coating the exterior surface of the tire carcasses or portions thereof prior to vulcanization for the purpose of facilitating removal of the cured tire from the mold matrix.

As previously indicated, the pre-formed silicone film may be used in its uncured condition before application to the tire or may be partially or totally cured either before or after its application to the carcass. If applied in its uncured form it may be partially or totally cured as for example by the radiant heating process described above in connection with the use of the silicone material in solution form.

After the pulley band carcass T has thus had a silicone material applied to it, the further processing of the thus prepared carcass will be the same as that now followed when employing any of the procedures and machines previously described such as for example the apparatus of my above-identified patent excepting that now the air bag or inflatable diaphragm may be omitted and the forming and curing fluid caused to have direct contact with the silicone film in place on the inner periphery of the tire carcass. While these silicone rubbers and like materials contemplated for use in the present invention have a relatively low abrasion resistance as compared with certain forms of organic rubber or compounds of organic rubber, nevertheless this is not a shortcoming as regards the use of the silicone film on the interior of the tire where conditions giving rise to abrasion are not ordinarily encountered. The relatively high tensile strength of the silicone film and in particular the water-resistant and water-repellant properties of these silicone films make them suitable for use for the purpose described and provide properties which makes it possible to successfully vulcanize a tire carcass without an air bag or diaphragm whereas all other attempts along this line using other materials such as butyl rubber, etc. have been virtual failures.

Other modes of applying the principle of the invention may be employed, change being made as regards the details described, provided the features stated in any of the following claims or the equivalent of such be employed.

I, therefore, particularly point out and distinctly claim as my invention:

1. The method of forming a pneumatic tire carcass which comprises applying to the uncured inner surface of a carcass a continuous film of a silicone polymer elastomer and then vulcanizing the tire in a confining mold while applying internal pressure by a fluid in direct contact with such film.

2. The method of forming a pneumatic tire carcass which comprises applying to the uncured inner surface of a carcass a continuous preformed film of a silicone polymer elastomer and then vulcanizing the tire in a confining mold while applying internal pressure by a fluid in direct contact with such film.

3. The method of forming a pneumatic tire carcass which comprises applying to the inner surface of a carcass a continuous precured film of a silicone polymer elastomer and then vulcanizing the tire in a confining mold while applying internal pressure by a fluid in direct contact with such film.

4. The method of forming a pneumatic tire carcass which comprises applying to the inner surface of a carcass a continuous preformed and partially cured film of a silicone polymer elastomer and then vulcanizing the tire in a confining mold while applying internal pressure by a fluid in direct contact with such film.

References Cited in the file of this patent

UNITED STATES PATENTS

| Number | Name | Date |
|---|---|---|
| 1,849,625 | Jenkinson | Mar. 15, 1932 |
| 2,442,196 | Coggenshall | May 25, 1948 |
| 2,457,688 | Krieble et al. | Dec. 28, 1948 |
| 2,460,795 | Warrick | Feb. 1, 1949 |
| 2,476,884 | Maynard | July 19, 1949 |
| 2,497,226 | McNeill | Feb. 14, 1950 |
| 2,541,137 | Warrick | Feb. 13, 1951 |
| 2,541,550 | Sarbach et al. | Feb. 13, 1951 |
| 2,592,724 | O'Neil | Apr. 15, 1952 |
| 2,645,265 | O'Neil | July 14, 1953 |
| 2,652,182 | Umbdenstock | Sept. 15, 1953 |

OTHER REFERENCES

"Rubber Age," vol. 56, Nov. 1944, pages 173–175.
Modern Plastics, page 124, January 1950.